F. L. LIPCOTT.
COUPLING.
APPLICATION FILED JUNE 3, 1919.

1,382,657.

Patented June 28, 1921.

WITNESS

INVENTOR
Fred L. Lipcott
BY
ATTORNEYS

UNITED STATES PATENT OFFICE.

FRED L. LIPCOTT, OF NEW YORK, N. Y., ASSIGNOR TO INTERNATIONAL MOTOR COMPANY, OF NEW YORK, N. Y., A CORPORATION OF DELAWARE.

COUPLING.

1,382,657.   Specification of Letters Patent.   Patented June 28, 1921.

Application filed June 3, 1919. Serial No. 301,404.

*To all whom it may concern:*

Be it known that I, FRED L. LIPCOTT, a citizen of the United States, residing in the borough of Manhattan of the city of New York, in the State of New York, have invented certain new and useful Improvements in Couplings, of which the following is a specification, reference being had to the accompanying drawing, forming a part hereof.

This invention relates to an improved flexible coupling and has for its principal object to associate with a coupling which is old in most respects, a casing therefor which shall exclude oil and foreign substances which are detrimental to the life of the coupling. This associated casing is of such form as to constitute a centering device for the coupling and the shafts connected thereto so that in the assembling of the coupling the shafts will automatically be properly alined with relation to each other and to the coupling members. Other advantages of the improved construction will appear in greater detail hereinafter in connection with the description of the embodiment shown in the accompanying drawing, in which—

Figure 1:
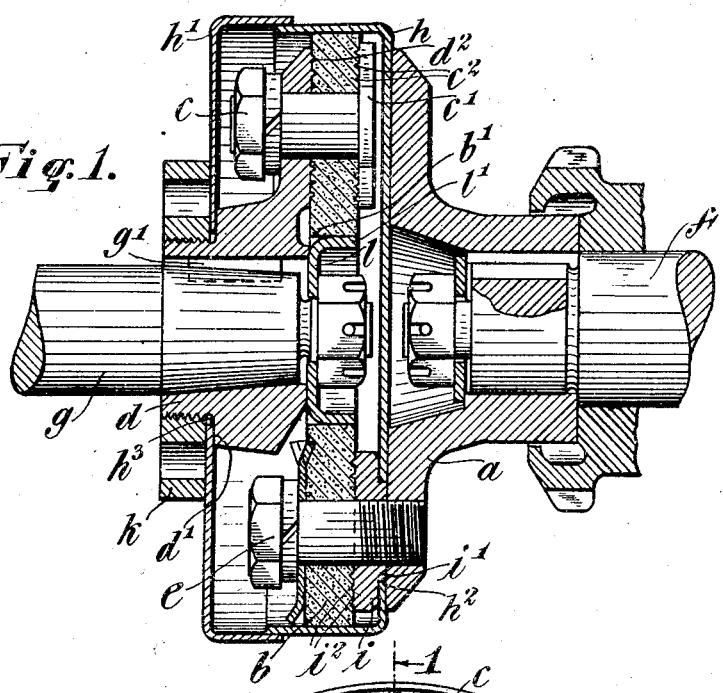
Figure 1 is a view in section of the improved coupling on the plane indicated by the line 1—1 of Fig. 2, portions of the connected shafts being indicated.
Figure 2:
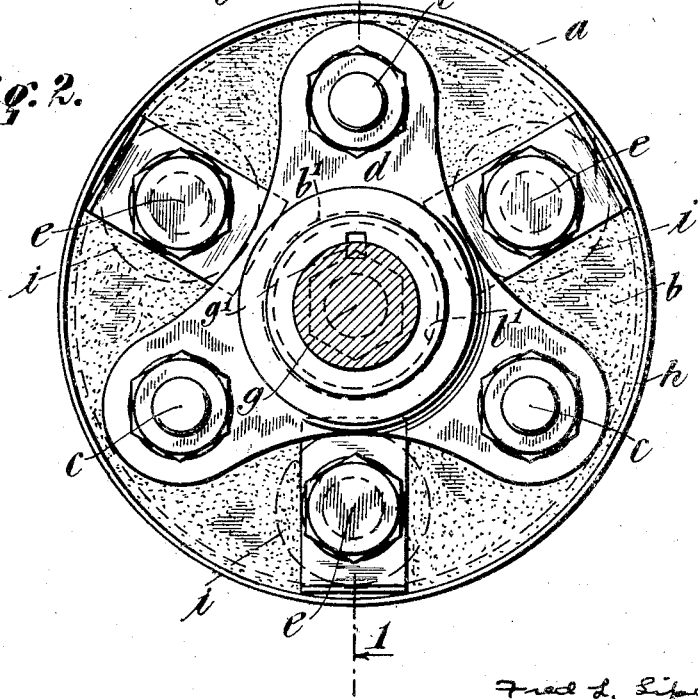
Fig. 2 is a face view of the coupling with the associated housing.

The flexible coupling comprises essentially a plate $a$, a disk $b$ of relatively stiff and durable but yielding material, a plurality of bolts $e$ by which the plate $a$ is connected to the disk $b$, and a second plate $d$ which is connected to the disk $b$ by other bolts $c$. The plate $a$ is secured to one shaft section $f$ while the other coupling plate $d$ is secured to the other shaft section $g$. As best shown in Fig. 2 the plate $d$ is preferably of substantially triangular outline. The construction thus far described is one that is well known in the art. The principal object of this invention is to associate with a coupling of the character described a housing which shall serve the purpose of excluding oil and foreign substances from the disk $b$ and its associated elements and at the same time perform a useful mechanical function in facilitating the assembling of the coupling with the shaft sections to be connected. In the illustrated embodiment this housing is shown as composed of two sections $h$, $h'$ which may be cylindrical in form and may be telescoped so as to constitute a complete inclosure for the coupling proper. One of the sections $h$ conforms generally to the outline of the disk $b$ and, when this disk is circular, as is usually the case, the section $h$ is circular and adapted to receive the disk with a snug sliding fit for a purpose which will appear later. The section $h$ is provided with openings $h^2$ in its end wall to receive the bolts $e$ which pass through the disk $b$ and engage the coupling plate $a$. Between the plate $a$ and the face of the disk $b$ will be placed a spacing washer $i$ which may be formed with a boss $i'$ adapted to fit snugly in the opening $h^2$ and provide a shouldered portion on the washer $i$ with relation to the housing section $h$. The face of the washer $i$ engages the inner wall of the section $h$ and serves to clamp this wall securely between the coupling plate $a$ and the washer. The other face of the washer $i$ may be serrated, as indicated at $i^2$, for the purpose of insuring a more intimate engagement between the washer and the disk $b$, these serrations being pressed into the face of the yielding material of the disk when the bolts $e$ are set up tightly.

The other section $h'$ of the housing is secured to the other coupling member $d$ by means of a lock nut $k$, the hub of the plate $d$ being adapted to pass through a central opening $h^3$ formed in the cover section $h'$. This hub of the plate $d$ is shouldered, as at $d'$, and the lock nut $k$ serves to clamp the cover section $h'$ between this shoulder and the nut. The shaft section $g$ enters the hub of the coupling plate $d$ with a loose fit and is keyed thereto as by a spline $g'$, the engagement between the shaft and the plate being such as to permit sufficient angular movement therebetween through the action of the flexible coupling. On the end of the shaft section $g$ may be secured a circular centering disk $l$ which is provided with an annular flange $l'$ adapted to rest snugly within a central opening $b'$ formed in the disk $b$.

In assembling the parts described herein the disk $b$ is first secured to the shaft section $g$ by means of the bolts $c$ passing through the coupling member $d$ and the disk. In this initial assembling the disk $b$ is centered on the shaft $g$ by means of the centering disk $l$. The engagement between the coupling plate $d$ and the disk $b$, as well as between the heads of bolts $c'$ on the ends of the bolts $c$, may be made more absolute by serrating those faces of the metal parts which rest against the disk, as indicated clearly at $d^2$ and $c^2$, for the plate $d$ and the head of the bolt $c'$, respectively. The housing section $h$ may then be slipped on to the disk $b$, the bolts and the washers $i$ having been placed in position and the bolts $e$ may then be threaded into the coupling plate $a$ until the disk $b$ is firmly secured thereto. The cover portion $h'$ of the housing is then slipped on or into the section $h$ and clamped in place by the lock nut $k$. The housing formed by the two sections $h, h'$ is substantially dustproof and moisture proof and prevents the exposure of the disk $b$ to deteriorating influences, such as oil and other foreign matter. Further, by reason of the fixed relation of the housing section $h$ to the coupling plate $a$ and the shaft section $f$ and the fixed relation of the disk $b$ to the shaft section $g$, it follows that when the disk $b$ is positioned within the housing section $h$ all of the parts of the coupling and the shaft sections themselves are properly centered and alined. This centering facilitates the assembling and disassembling of the coupling. In order to disassemble the coupling the cover plate $h'$ is released by the lock nut $k$ and moved back on the shaft $g$ whereupon the bolts $e$ may be backed out of the coupling plate $a$ until their ends clear the coupling plate whereupon the entire coupling with the shaft $g$ may be moved laterally. This facility in disassembling is of special importance where, as might be the case, a driven unit is connected directly to one of the shaft sections $f$ and $g$ and it is desirable to remove such unit bodily without disturbing any associated shafting.

Reference is to be had to the appended claims for a definition of the scope of the invention.

I claim as my invention:

1. In combination with two shafts, a spider secured to each shaft, a flexible coupling member to which each of said spiders is secured and a closed housing composed of two complementary sections inclosing said flexible coupling member and in which said flexible coupling member has a snug engagement, one section being carried with each of said spiders.

2. In combination with two shafts, a coupling member secured to each shaft, a flexible coupling member to which each of said first named coupling members is secured whereby universal movement between said rings is afforded, a sectional housing inclosing said flexible coupling member, bolts for connecting the flexible coupling member with one of said first named coupling members and passing through one of the sections of the housing, and means carried by the other of said first named coupling members to hold the sections of the housing together.

3. In combination with two shafts, a coupling member secured to each shaft, a flexible coupling member to which each of said first named coupling members is secured whereby universal movement between said rings is afforded, a sectional housing inclosing said flexible coupling member and including a telescoping cover section, bolts for connecting the flexible coupling member with one of said first named coupling members and passing through one of the sections of the housing, washers interposed between the flexible coupling member and the inner wall of the last named section of the housing, and a lock nut on the hub of the other of said coupling members to maintain the cover section of the housing in proper relation to the other section of the housing.

This specification signed this 23rd day of May, A. D. 1919.

FRED L. LIPCOTT.